(12) United States Patent
Tusnial et al.

(10) Patent No.: US 11,743,162 B1
(45) Date of Patent: Aug. 29, 2023

(54) SYSTEM, METHOD, AND COMPUTER PROGRAM FOR OFFERING EXPERIENCE-BASED SUBSCRIPTIONS TO SERVICES

(75) Inventors: Aloke Tusnial, Johns Creek, GA (US); Nir Rapaport, Herut (IL); Nir Levy, Tel Aviv (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 1832 days.

(21) Appl. No.: 13/466,020

(22) Filed: May 7, 2012

(51) Int. Cl.
 *H04L 43/12* (2022.01)

(52) U.S. Cl.
 CPC ......... *H04L 43/12* (2013.01); *G06Q 2220/18* (2013.01)

(58) Field of Classification Search
 CPC ......... H04W 4/50; H04W 4/20; H04W 48/14; H04W 4/02; H04W 28/02; H04W 12/08; H04L 12/14; H04L 67/306; H04L 12/1407; H04L 41/0896; H04M 15/66; H04M 2215/0188; G06Q 10/06375; G06Q 30/0284; G06F 16/783; G06F 16/152
 See application file for complete search history.

(56) References Cited

U.S. PATENT DOCUMENTS

| | | | |
|---|---|---|---|
| 7,441,037 B2 | 10/2008 | Saxena | |
| 7,600,043 B2 * | 10/2009 | Koshino | H04L 12/2805 709/219 |
| 8,351,898 B2 * | 1/2013 | Raleigh | H04L 41/0893 709/224 |
| 8,813,217 B2 * | 8/2014 | Guan | H04L 12/14 726/14 |
| 2004/0199667 A1 | 10/2004 | Dobbins | |
| 2008/0275839 A1 | 11/2008 | Zabawskyj et al. | |
| 2010/0036604 A1 * | 2/2010 | O'Connell | G01C 21/3461 701/533 |
| 2012/0123870 A1 * | 5/2012 | Denman | G06Q 30/0241 705/14.66 |
| 2012/0209753 A1 * | 8/2012 | Hodges | H04L 12/146 705/30 |
| 2013/0085864 A1 * | 4/2013 | Ahmed | G06Q 30/04 705/14.66 |
| 2013/0238473 A1 * | 9/2013 | Fan | G06Q 30/04 705/34 |

FOREIGN PATENT DOCUMENTS

EP 2448174 A1 * 5/2012 ............. H04L 47/10

OTHER PUBLICATIONS

Bantz, The emerging model of subscription computing, IT professional, 2002, vol. 4 (4), p. 27-32.*

* cited by examiner

*Primary Examiner* — Ilse I Immanuel
(74) *Attorney, Agent, or Firm* — Zilka-Kotab, P.C.

(57) ABSTRACT

A system, method, and computer program product are provided for offering experience-based subscriptions to services. In use, a service package is created for a network service provider, the service package relating to a service experience specific at least to a subset of content accessible over a communication network via the network service provider. Additionally, a user subscription to the service package is received. Further, access to the subset of the content is provided based on the user subscription.

5 Claims, 6 Drawing Sheets

| | | |
|---|---|---|
| MySocial Network | | • Unlimited Twitter, Facebook<br>• 2GB limit<br>• Pay as you go at breach |
| MySports | | • Guaranteed QoS - evenings and weekends<br>• 5GB limit<br>• 2GB streaming media |
| MyBusiness | | • Unmetered access – 7pm to midnight<br>• Shared quota across employees<br>• Guaranteed QoS – 7am to 7pm M-F |
| MyFamily | | • Shared quota<br>• Divert quota among members<br>• Add more devices when I want |

FIGURE 6

SYSTEM, METHOD, AND COMPUTER PROGRAM FOR OFFERING EXPERIENCE-BASED SUBSCRIPTIONS TO SERVICES

FIELD OF THE INVENTION

The present invention relates to service offerings, and more particularly to offering subscriptions to service packages.

BACKGROUND

Conventionally, communication-based services are offered as service packages on a subscription basis. For example, Internet access may be offered via a subscription to an Internet-based package with an Internet service provider. Unfortunately, the service packages that have traditionally been offered for subscriptions thereto have been limited.

Generally, service providers offer either unlimited data access or provide limited/tiered data plans. In any case, the package offerings are solely based on an amount of data consumption, and do not differentiate on what types of data is being consumed. There is thus a need for addressing these and/or other issues associated with the prior art.

SUMMARY

A system, method, and computer program product are provided for offering experience-based subscriptions to services. In use, a service package is created for a network service provider, the service package relating to a service experience specific at least to a subset of content accessible over a communication network via the network service provider. Additionally, a user subscription to the service package is received. Further, access to the subset of the content is provided based on the user subscription.

BRIEF DESCRIPTION OF THE DRAWINGS

FIG. 6 illustrates a graphical user interface offering experience-based subscriptions to services, in accordance with one embodiment.

DETAILED DESCRIPTION

Figure 1:
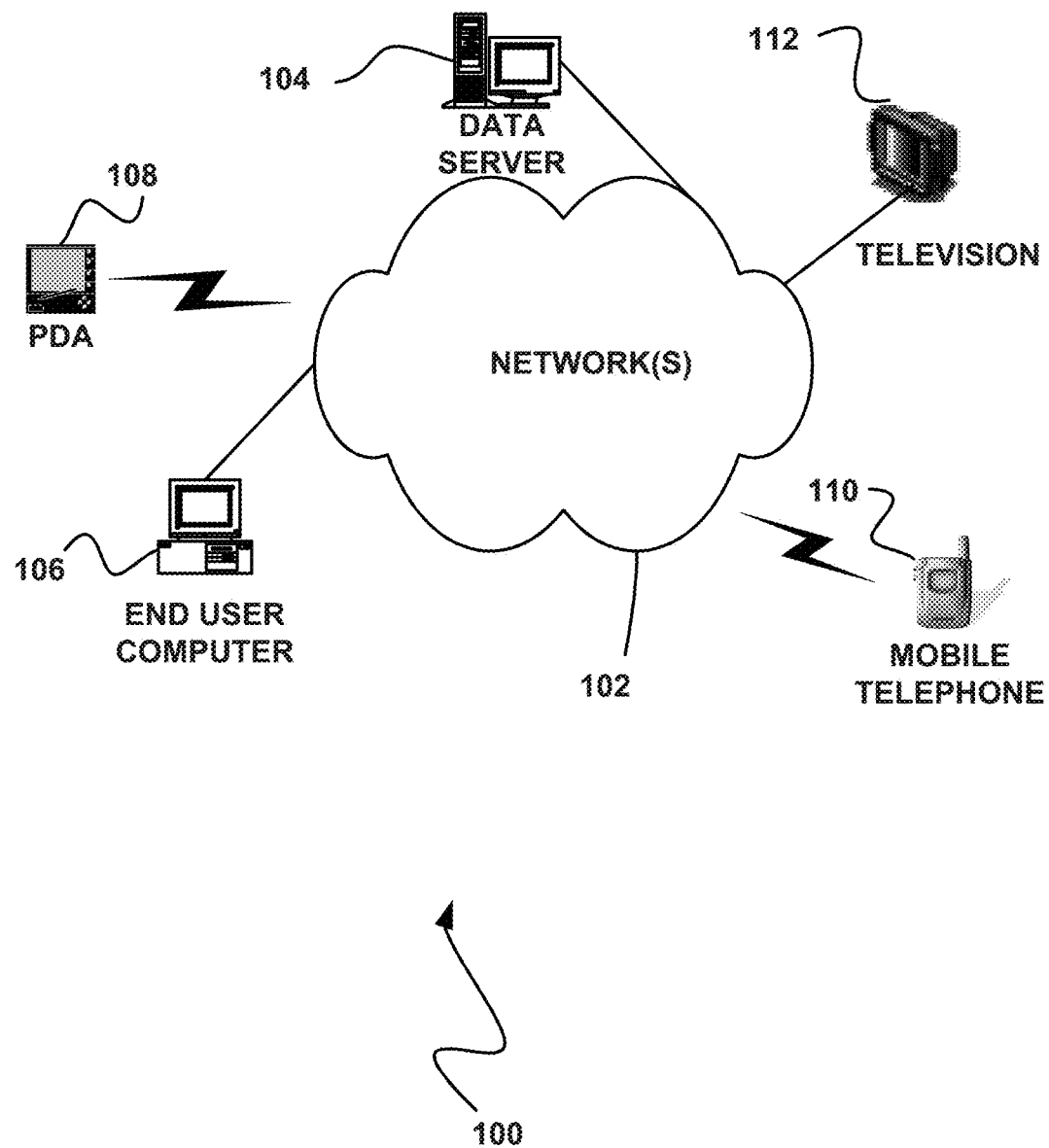
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
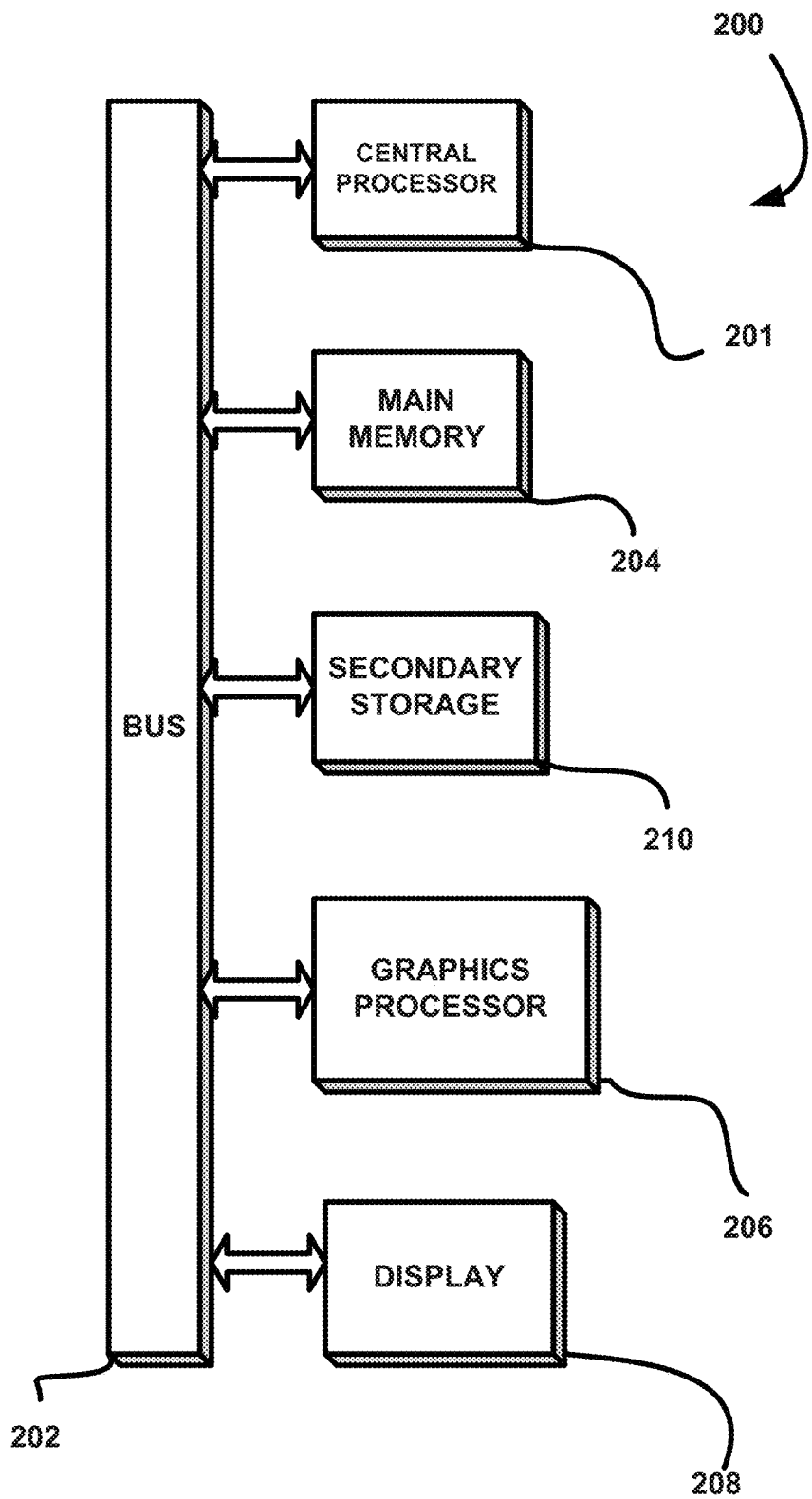
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
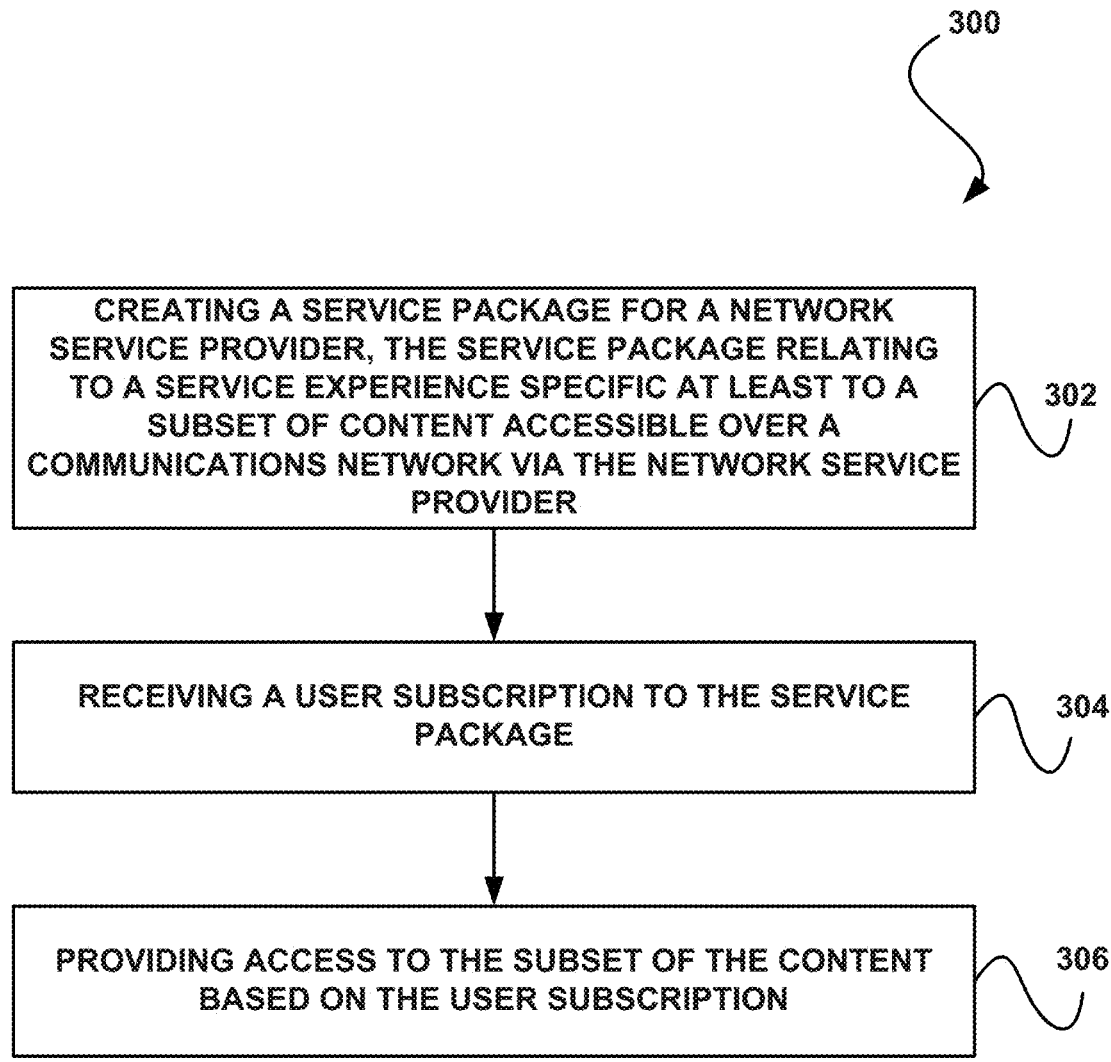
FIG. 3 illustrates a method for offering experience-based subscriptions to services, in accordance with one embodiment.

FIG. 3 illustrates a method 300 for offering experience-based subscriptions to services, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a service package is created for a network service provider, the service package relating to a service experience specific at least to a subset of content accessible over a communication network via the network service provider. In the context of the present description, the network service provider includes any provider of a network-related service associated with the communication network. For example, the communication network may be the Internet, and the network service provider may be an Internet service provider providing access to the Internet. Of course, it should be noted that the communication network may be any network over which communications between remote devices may be established, such that the network service provider may be any provider of a service enabling such communications to be established over the network.

As noted above, a service package is created for the network service provider. It should be noted that the service package may be any offer (e.g. plan, etc.) to which a user may subscribe for receiving access to the network-related service provided by the service provider. Thus, the service package may be an offering to which a user may subscribe.

As also noted above, the service package relates to a service experience specific at least to a subset of content accessible over a communication network via the network service provider. For example, the service package may provide the service experience to a subscribing user, such that the subscribing user may be given access to the subset of the content (e.g. for experiencing the subset of the content). Such content may optionally be websites, in the context of a communication network that is the Internet.

The service experience is an experience capable of being had by a user with respect to the network-based service provided by the network service provider. In various embodiments, the service experience may include access to the subset of the content, parameters for providing such access (e.g. quality of service), etc. In this way, different service packages may provide different service experiences that are content specific and optionally service specific.

In one exemplary embodiment, the service experience may be for a category of content that includes the subset of the content. Just by way of example, the service experience may be for social media content, such that the subset of the content includes social media websites (e.g. LinkedIn, Facebook, Twitter, etc.). As another example, the service experience may be for entertainment content, such that the subset of the content includes entertainment websites (e.g. YouTube, Netflix, Hulu, etc.). As yet another example, the service experience may be for office-based content, such that the subset of the content includes web-based office applications (e.g. email, calendar, tasks, etc.).

In another embodiment, the service package may be mapped to at least one destination address [e.g. Internet protocol (IP) address] storing the subset of the content. In this way, the service package may relate to a service experience involving content accessible at the destination address(es). Of course, it should be noted that the service package may indicate the subset of the content to which it provides access in any desired manner.

Moreover, the service package may be created manually by a user, as an option. For example, a user may configure the subset of the content and optionally the service attributes to be included in the service package. As another option, the service package may be created automatically based on predetermined criteria. Examples regarding the automated creation of the service package will be described in more detail below with reference to FIG. 4.

Additionally, as shown in operation 304, a user subscription to the service package is received. The user subscription may be any subscription by a user to the service package. For example, the user may subscribe to the service package by requesting a subscription to the service package and optionally paying a fee for the service package (e.g. such that user subscription is received in exchange for the fee paid by a user). Such a request may be made via a graphical user interface (GUI) displaying (e.g. offering) the service package (e.g. with other available service packages), such that the user subscription may be received in response to offering the service package to a user.

Further, as shown in operation 306, access to the subset of the content is provided based on the user subscription. Such access may be provided to the user having the subscription, in one embodiment. In another embodiment, the access may be provided to devices of the user registered by the user under the user subscription, such that, for example, the user subscription enabling the access to the subset of the content may be shared among a plurality of devices of the user.

It should be noted that the access may be viewing the subset of the content, downloading the subset of the content, editing the subset of the content, executing the subset of the content, retrieving the subset of the content, streaming the subset of the content, etc. While access to the subset of the content is described above, it should be noted that access to any portion of the subset of the content may be provided based on the user subscription. For example, the access to a portion of the subset of the content may be provided in response to a request by the user having the user subscription, user device registered under the user subscription, etc.

In this way, the user subscription to the service package relating to a particular service experience may enable access to the subset of the content by a user having the user subscription or user device registered under the user subscription. This may enable the user to subscribe to a service experience specific to content (and optionally service attributes controlling a manner in which the content is accessible), instead of limiting the user to a subscription that is limited solely on an amount of data consumed or otherwise not limited in any manner.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
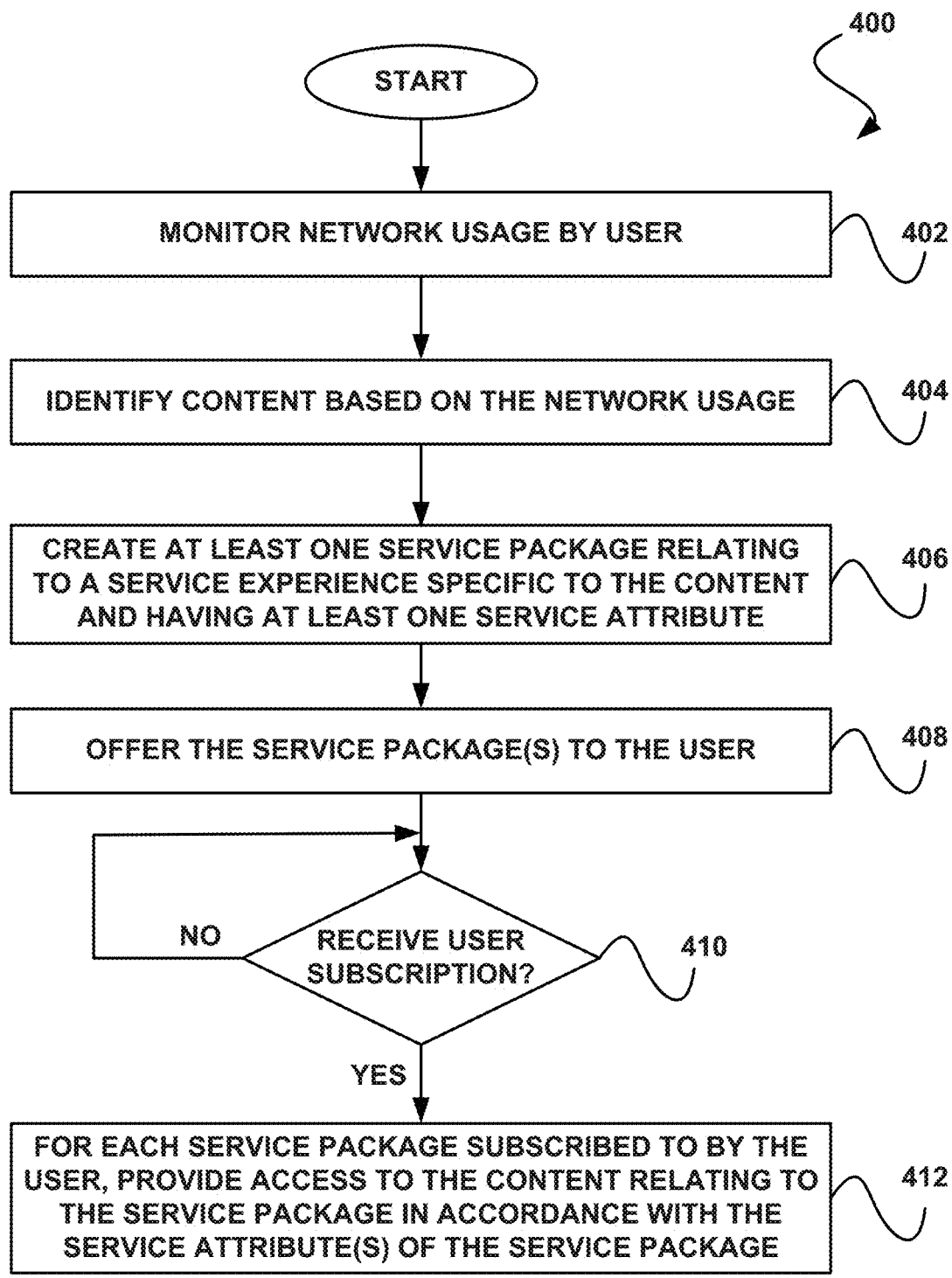
FIG. 4 illustrates a method for creating experience-based subscription offerings from network usage data, in accordance with another embodiment.

FIG. 4 illustrates a method 400 for creating experience-based subscription offerings from network usage data, in accordance with another embodiment. As an option, the method 400 may be carried out in the context of the details of FIGS. 1-3. For example, the method 400 may be performed by a service provider of a communications network. Of course, however, the method 400 may be carried out in any desired environment. Further, the aforementioned definitions may equally apply to the description below.

As shown in operation 402, network usage by a user is monitored. The network usage may be any data received and/or transmitted by the user over a communications network. For example, the network usage may be websites visited by the user, data streamed from the communications network to a device of the user, content uploaded to the communications network by the user, etc. Such monitoring may optionally be performed by various components of the communications network, such as business support systems (BSS), operations support systems (OSS), network elements, etc.

Content is then identified based on the network usage, as show in operation 404. The content may be the data received and/or transmitted by the user over the communications network, such as the websites, applications, streaming data, downloaded data, uploaded data, etc. Thus, the content may be a subset of all content accessible via the communications network. As an option, a context of the content may also be identified based on the network usage, such as a location of a device of the user when the content was received/transmitted, a service used to receive/transmit the content, a time of day when the content was received/transmitted, bandwidth used to receive/transmit the content, etc.

As a further option, the content, and optionally the context thereof, may be identified by a service provider. For example, the service provider may implement a business intelligence system that receives an indication of the network usage from the components of the communications network monitoring the network usage, and further analyzes the information to identify the content and/or context thereof. An indication of the network usage, such as the identified content and/or context may furthermore be stored in a profile for the user.

Moreover, at least one service package relating to a service experience specific to the content and having at least one service attribute is created. Note operation 406. The service package may enable a subscriber thereto to access the content according to the service attribute, in the present embodiment. For example, the service package may enable the service experience by providing access to the content according to the service attributes, as described in more detail below.

In this way, the service package may indicate the content identified from the network usage to which a subscriber is allowed access. Such indication may be provided by identifying specific content to which the service package grants access (such that access to all other content is denied), or identifying specific content to which the service package denies access (such that access to all other content is allowed). Just by way of example, the service package may be created by analyzing historical network usage, predicting future network usage to be associated with the content, and including in the service package the content.

As noted above the service package may also indicate at least one service attribute (e.g. such that the service experience is specific to the service attribute). The service attribute may optionally be determined from the context of the content, such as the bandwidth used, a latency encountered, the service used, the location of the user device, the time of day, etc. Just by way of example, the service attribute may be a quality of service to be ensured with respect to an access to the content, a service allowed or disallowed to be used, a location from which the content may be accessed, a time of day during which the content may be accessed, etc.

Accordingly, the service package may be created based on the network usage, the profile of the user indicating the content and/or context thereof, etc. This may allow the content specific to the service experience to include content indicated by the network usage as having been previously accessed (e.g. by the user), such that for example, an in-context service package may be offered that relates to a service experience associated with actual network usage. It should also be noted that, as an option, a price (i.e. monetary cost) for subscribing to the service package may be configured based on the content and/or context thereof, such that service packaging pricing may be dynamic in accordance with rules, policies, etc. Of course, cross subsidizing, third party sponsorship, coupons, free of charge, or any other payment policies may similarly be dynamically configured for the service package.

Further, as shown in operation 408, the service package(s) are offered to the user. Just by way of example, the service package(s) created in operation 406 may be offered to the user via a GUI presenting the service package(s) for selection thereof. One example of such a GUI will be described in more detail below with respect to FIG. 6.

It is then determined in decision 410 whether a user subscription to one or more of the service packages has been received. For example, the user subscription for one of the service package(s) may be received by the user selecting one of the service package(s) from the GUI, paying a fee associated with the selected one of the service package(s), registering for one of the service package(s), or in any way subscribing to one of the service package(s).

If it is determined that a user subscription to one or more of the service packages has not been received, the method 400 continues to wait for such a subscription. However, once it is determined that a user subscription to one or more of the service packages has been received, for each service package subscribed to by the user, access to the content relating to the service package is provided in accordance with the service attribute(s) of the service package. Note operation 412. Thus, different service experiences may be provided via a user subscription to different service packages, by enabling for each service package access to content specific to the service package in accordance with service attributes specific to the service package.

In one embodiment, the service packages may be content specific by being mapped to one or more content sources (e.g. destination IP addresses). A charging engine may then charge or "aggregate" the network usage based on these content sources. In another embodiment, the service provider may implement a Deep Packet Inspection (DIP) or Traffic Detection Function (TDF) to identify the content to which the user is requesting access, and may allow/deny such access based on the content indicated by the service package subscribed to by the user (e.g. whether the requested content matches the content allowed to be accessed by the service package). In yet another embodiment, the service provider may implement a Policy and Charging Rules Function (PCRF) or a Policy Server in the communications network to restrict access to the content indicated by the service package subscribed to by the user, and further optionally provide differential quality of service, throttling functions, etc. based on such service package. It should be noted that enabling content access by the service package subscriptions may be provided in a real-time or an offline manner, and furthermore may be for a prepaid or a postpaid service.

As a further option, network usage of the user may be monitored, (e.g. continually, periodically, etc.) even after subscribing to one of the service packages. This may allow additional (e.g. add-on) or replacement service packages to be proactively created and offered to the user, based on the current network usage of the user. In this way, the user may be allowed to subscribed to (e.g. pay for) service packages offering a service experience to which they can relate.

Figure 5:
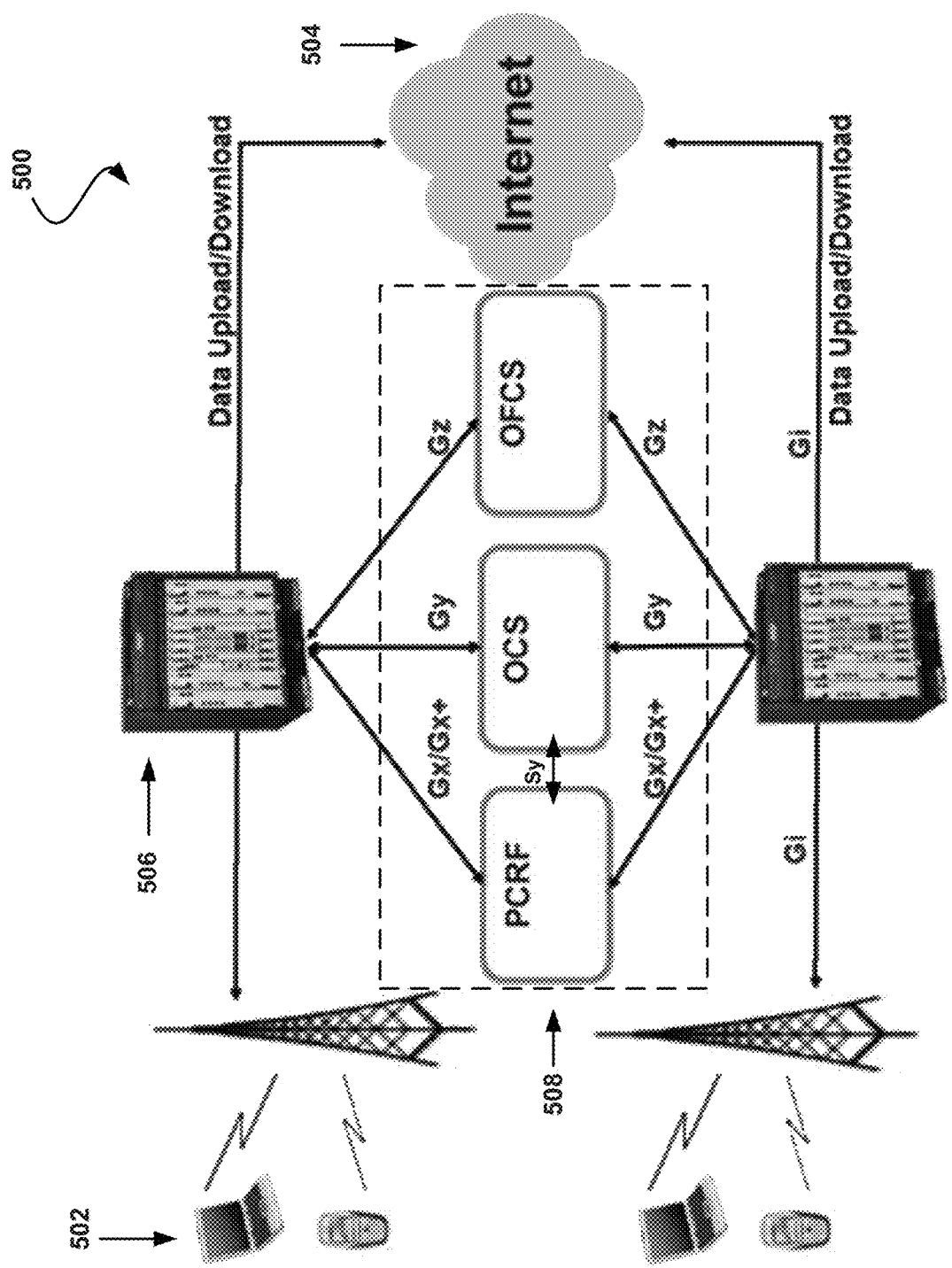
FIG. 5 illustrates a system for offering experience-based subscriptions to the Internet, in accordance with one embodiment.

FIG. 5 illustrates a system 500 for offering experience-based subscriptions to the Internet, in accordance with one embodiment. As an option, the system 500 may be implemented in the context of the details of FIGS. 1-4. Of course, however, the system 500 may be implemented in any desired environment. Again, the aforementioned definitions may equally apply to the description below.

As shown, mobile devices 502 are in communication with the Internet 504 via network components 506. A service provider's system 508 is also in communication with the network components 506 for receiving Internet usage information associated with the mobile devices 502 from the network components 506. The service provider's system 508 includes a PRCF, an online charging system and an offline charging system for enabling access to Internet content, and charging a subscriber for such access, according to the subscribed to service package. The online charging system and the offline charging system may be on the same platform or different platforms (with or without connectivity between them).

The service provider's system 508 also includes business intelligence (not shown) for creating service packages relating to a service experience that is content specific. The service packages may then be offered by the service provider's system 508 to users, such that subscriptions thereto may be received from the users for enabling the aforementioned Internet access.

FIG. 6 illustrates a graphical user interface (GUI) 600 offering experience-based subscriptions to services, in accordance with one embodiment. As an option, the GUI 600 may be implemented in the context of the details of FIGS. 1-5. Of course, however, the GUI 600 may be implemented in any desired environment. Yet again, the aforementioned definitions may equally apply to the description below.

As shown by way of example, a user may be offered an "Unlimited Social Network" package which allows unlimited access to predetermined social networking websites, but which would have a pay-per-use capability for any other websites. The offer may optionally be created for a user who has previously accessed the Internet primarily for social networking purposes.

As another example, a user may be offered a "Guaranteed Quality of Service" package which allows access to any content at a guaranteed quality of service, but only during predetermined times of the day (e.g. evenings and weekends), and which is limited to a download data amount and a streaming data amount. As yet another example, a user may be offered an "Unmetered Access" package which allows access to any content at predetermined times of the day, but where quality of service is guaranteed only at predetermined times of the day. To this end, a user could select from the service packages presented via the GUI 600.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code adapted to be executed by a computer to perform a method comprising:
   receiving, by a service provider system, an indication of network usage by a user;
   analyzing, by the service provider system, the received indication of the network usage to:
      identify content that was previously received by the user during the network usage, and
      identify a context in which the content was previously received, including:
         a location of a device of the user when the content was received,
         a service used to receive the content,
         a time of day when the content was received, and
         bandwidth used to receive the content;
   predicting, by the service provider system, future network usage to be associated with the identified content;
   creating automatically, by the service provider system based on the indication of the network usage, a service package for the user that indicates:
      the identified content as allowed to be accessed, and
      a plurality of service attributes for accessing the identified content, the plurality of service attributes selected based on the identified context and including:
         a service allowed to be used to access the identified content,
         a location from which the identified content is allowed to be accessed, and
         a time of day when the identified content is allowed to be accessed;
   receiving, by the service provider system from the user, a subscription to the service package; and
   based on the service provider system receiving the subscription to the service package from the user, providing, by the service provider system, the user access to the identified content in accordance with the plurality of service attributes, including:
      implementing a Deep Packet Inspection (DPI) to determine content to which the user is currently requesting access, wherein the DPI determined content to which the user is currently requesting access is the same as the content that was previously received by the user during the network usage, and
      allowing the access to the determined content in accordance with the plurality of service attributes, based on the determined content being indicated in the service package subscribed to by the user.

2. The non-transitory computer readable medium of claim 1, wherein the subscription is received with a fee paid by the user.

3. A method, comprising:
   receiving, by a service provider system, an indication of network usage by a user;
   analyzing, by the service provider system, the received indication of the network usage to:
      identify content that was previously received by the user during the network usage and identify a context in which the content was previously received, including:
         a location of a device of the user when the content was received,
         a service used to receive the content,
         a time of day when the content was received, and
         bandwidth used to receive the content;
   predicting, by the service provider system, future network usage to be associated with the identified content;
   creating automatically, by the service provider system based on the indication of the network usage, a service package for the user that indicates:
      the identified content as allowed to be accessed, and
      a plurality of service attributes for accessing the identified content, the plurality of service attributes selected based on the identified context and including:
         a service allowed to be used to access the identified content,
         a location from which the identified content is allowed to be accessed, and
         a time of day when the identified content is allowed to be accessed;
   receiving, by the service provider system from the user, a subscription to the service package; and
   based on the service provider system receiving the subscription to the service package from the user, providing, by the service provider system, the user access to the identified content in accordance with the plurality of service attributes, including:
      implementing a Deep Packet Inspection (DPI) to determine content to which the user is currently requesting access, wherein the DPI determined content to which the user is currently requesting access is the same as the content that was previously received by the user during the network usage, and
      allowing the access to the determined content in accordance with the plurality of service attributes, based on the determined content being indicated in the service package subscribed to by the user.

4. A service provider system, comprising:
   a hardware processor for:
   receiving an indication of network usage by a user;
   analyzing the received indication of the network usage to:

identify content that was previously received by the user during the network usage and identify a context in which the content was previously received, including:
- a location of a device of the user when the content was received,
- a service used to receive the content,
- a time of day when the content was received, and
- bandwidth used to receive the content;

predicting future network usage to be associated with the identified content;

creating automatically, based on the indication of the network usage, a service package for the user that indicates:
- the identified content as allowed to be accessed, and
- a plurality of service attributes for accessing the identified content, the plurality of service attributes selected based on the identified context and including:
  - a service allowed to be used to access the identified content,
  - a location from which the identified content is allowed to be accessed, and
- a time of day when the identified content is allowed to be accessed;

receiving a subscription to the service package; and based on the service provider system receiving the subscription to the service package from the user, providing the user access to the identified content in accordance with the plurality of service attributes, including:
- implementing a Deep Packet Inspection (DPI) to determine content to which the user is currently requesting access, wherein the DPI determined content to which the user is currently requesting access is the same as the content that was previously received by the user during the network usage, and
- allowing the access to the determined content in accordance with the plurality of service attributes, based on the determined content being indicated in the service package subscribed to by the user.

5. The non-transitory computer readable medium of claim 1, wherein the service package is specific to the identified content previously received by the user by indicating that the identified content is allowed to be accessed, wherein the service package is specific to the service attributes which control a manner in which the identified content is made accessible, and wherein all other content besides the identified content is denied through the service package as a result of the service package indicating that the identified content is allowed to be accessed.

* * * * *